United States Patent
Jung et al.

(10) Patent No.: US 10,820,301 B2
(45) Date of Patent: Oct. 27, 2020

(54) METHOD FOR OPERATING TERMINAL IN ACCORDANCE WITH SEMI-PERSISTENT SCHEDULING IN WIRELESS COMMUNICATION SYSTEM, AND TERMINAL DEVICE USING METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/073,704

(22) PCT Filed: Jan. 31, 2017

(86) PCT No.: PCT/KR2017/001009
§ 371 (c)(1),
(2) Date: Jul. 27, 2018

(87) PCT Pub. No.: WO2017/131495
PCT Pub. Date: Aug. 3, 2017

(65) Prior Publication Data
US 2019/0037539 A1    Jan. 31, 2019

Related U.S. Application Data

(60) Provisional application No. 62/288,404, filed on Jan. 28, 2016.

(51) Int. Cl.
*H04W 72/04* (2009.01)
*H04W 72/12* (2009.01)
*H04W 72/14* (2009.01)

(52) U.S. Cl.
CPC ....... *H04W 72/04* (2013.01); *H04W 72/0446* (2013.01); *H04W 72/12* (2013.01);
(Continued)

(58) Field of Classification Search
CPC ..................................................... H04W 72/04
See application file for complete search history.

(56) References Cited

U.S. PATENT DOCUMENTS 9,445,365 B2 * 9/2016 Makharia .......... H04W 52/0216
2008/0123520 A1 * 5/2008 Ji ...................... H04W 72/1252
370/216

(Continued)

FOREIGN PATENT DOCUMENTS

WO    2013131264    9/2013
WO    2013169173    11/2013

(Continued)

OTHER PUBLICATIONS

PCT International Application No. PCT/KR2017/001009, International Search Report dated May 1, 2017, 2 pages.

(Continued)

*Primary Examiner* — Kodzovi Acolatse
*Assistant Examiner* — Abdeltif Ajid
(74) *Attorney, Agent, or Firm* — Lee Hong Degerman Kang Waimey

(57) ABSTRACT

Provided are a method for operating a terminal in accordance with semi-persistent scheduling (SPS) in a wireless communication system, and a terminal using the method. The method comprises: transmitting traffic information; receiving an SPS configuration determined on the basis of the traffic information; and transmitting a signal in at least one resource among resources conforming to the SPS configuration, wherein the traffic information notifies of a pattern of traffic generated by a terminal.

10 Claims, 17 Drawing Sheets

(52) U.S. Cl.
CPC .... *H04W 72/1263* (2013.01); *H04W 72/1268* (2013.01); *H04W 72/14* (2013.01)

(56) References Cited

U.S. PATENT DOCUMENTS

| | | | |
|---|---|---|---|
| 2010/0195605 A1* | 8/2010 | Suzuki | H04W 76/28 370/329 |
| 2010/0215002 A1* | 8/2010 | Kim | H04L 65/1069 370/329 |
| 2014/0198699 A1 | 7/2014 | Makharia et al. | |
| 2015/0085728 A1 | 3/2015 | Majjigi et al. | |
| 2015/0282148 A1* | 10/2015 | Le | H04W 72/0406 370/329 |
| 2016/0242229 A1* | 8/2016 | Balachandran | H04W 4/70 |
| 2017/0019887 A1* | 1/2017 | Jiang | H04W 72/0406 |
| 2017/0071010 A1* | 3/2017 | Lim | H04W 72/042 |
| 2018/0255569 A1* | 9/2018 | Aiba | H04W 72/12 |

FOREIGN PATENT DOCUMENTS

| | | |
|---|---|---|
| WO | 2015058382 | 4/2015 |
| WO | 2015094033 | 6/2015 |

OTHER PUBLICATIONS

QC, "Summary of Informal Email Discussion on SPS", R1-157563, 3GPP TSG RAN WG1 Meeting #83, Nov. 2015, 7 pages.
3rd Generation Partnership Project; Technical Specification Group Radio Access Network; Evolved Universal Terrestrial Radio Access (E-UTRA); User Equipment (UE) procedures in idle mode (Release 8), 3GPP Ts 36.304 V8.5.0, Mar. 2009, 30 pages.
European Patent Office Application Serial No. 17744616.8, Search Report dated Jun. 17, 2019, 9 pages.

* cited by examiner

METHOD FOR OPERATING TERMINAL IN ACCORDANCE WITH SEMI-PERSISTENT SCHEDULING IN WIRELESS COMMUNICATION SYSTEM, AND TERMINAL DEVICE USING METHOD

CROSS-REFERENCE TO RELATED APPLICATIONS

This application is the National Stage filing under 35 U.S.C. 371 of International Application No. PCT/KR2017/001009, filed on Jan. 31, 2017, which claims the benefit of U.S. Provisional Application No. 62/288,404, filed on Jan. 28, 2016, the contents of which are all hereby incorporated by reference herein in their entirety.

BACKGROUND OF THE INVENTION

Field of the Invention

The present invention relates to wireless communications and, more particularly, to a method for operating a terminal in accordance with semi-persistent scheduling in a wireless communication system and a terminal device using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3rd Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D22) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

A D2D operation is also referred to as an operation in view of signal transmission and reception between neighboring devices and has various advantages. For example, a D2D user equipment (UE) may perform data communication with a high transmission rate and low delay. Further, the D2D operation may distribute traffic concentrated on a base station, and may also function to extend the coverage of the base station in the case that the D2D UE serves as a relay.

In LTE-A, terminal-to-terminal interface is referred to as a sidelink. Actions that a terminal may perform on a sidelink include sidelink communication and sidelink discovery. The D2D operation described above may also be referred to as a sidelink operation.

Meanwhile, as one of resource allocation methods for a UE, there is a semi-persistent scheduling (SPS). The SPS is a scheme that configures a plurality of resources that may perform transmission/reception of a signal to a UE through a higher layer signal such as radio resource control (RRC). The plurality of resources may be subframes that have specific periods. For example, in the case that there is a data traffic generated with a predetermined period in a UE, when the resource used for transmitting the data traffic is setup as the SPS scheme, the signal overhead between the UE and a network may be decreased and a resource use anticipation is available, and accordingly, scheduling efficiency may also be improved.

However, in the conventional SPS, a base station is unavailable to know a traffic generation timing of a UE. Accordingly, even in the case that a traffic generation in a UE is generated nearly periodically, it is hard to allocate the resources proper for periodic generation of such traffic in the SPS scheme.

In addition, the UE that is going to perform a vehicle-to-everything (V2X) communication, which is currently receiving attention, may be a device installed on a vehicle. The UE installed on a vehicle may generate a specific signal periodically, but may change the period of the specific signal depending on a speed or a direction of the vehicle.

In such a case, there may be a discrepancy between resource allocation timing according to the SPS and an actual traffic generation timing of a UE, and as a result, the efficiency of the SPS may be ineffective. Accordingly, a method and apparatus for improving an efficiency of the SPS is required.

SUMMARY OF THE INVENTION

The present invention provides a method for operating a terminal in accordance with the SPS in a wireless communication system and a terminal device using the method.

In one aspect, provided is a method for operating a User Equipment (UE) according to semi-persistent scheduling (SPS) in a wireless communication system. The method includes transmitting traffic information, receiving SPS configuration determined based on the traffic information and transmitting a signal in at least one resource among resources according to the SPS configuration. The traffic information informs a pattern of traffic generated by the UE.

The SPS configuration may be a message configuring a plurality of resources which is periodically configured.

The traffic information may include at least one of a period of the traffic generated by the UE and offset information that informs timing of the traffic generated by the UE.

The offset information may be information informing a generation timing of the traffic generated by the UE based on a reference timing that the UE and the network commonly know.

The reference timing may be a first subframe of a frame of which system frame number is zero.

The traffic information may further include information informing a final destination of the traffic generated by the UE.

The traffic information may further include information informing a latency requirement required in the traffic generated by the UE.

The method may further include receiving a first SPS configuration. The first SPS configuration may be received through a higher layer message.

The method may further include detecting a difference between a resource pattern according to the first SPS configuration and a pattern of the traffic generated by the UE. When the difference is a predetermined value or greater, the method further include transmitting SPS adjustment request that requests an adjustment of the first SPS configuration to the network.

The SPS adjustment request may be transmitted with being included in the traffic information.

The SPS adjustment request may include information indicating a resource that the UE is not going to use among the resources configured according to the first SPS configuration.

The SPS adjustment request may request to advance or delay the resources according to the first SPS configuration temporally.

The SPS configuration may include a bitmap, wherein each bit of the bitmap may correspond to each subframe among a plurality of subframes configured by the SPS configuration.

Each bit of the bitmap may represent whether each subframe among the plurality of subframes configured by the SPS configuration is used for a signal transmission of the UE.

In another aspect, provided is a User Equipment (UE). The UE includes a transceiver configured to transmit and receive a radio signal and a processor configured to operate with being connected to the transceiver. The processor is configured to perform: transmitting traffic information, receiving SPS configuration determined based on the traffic information and transmitting a signal in at least one resource among resources according to the SPS configuration. The traffic information informs a pattern of traffic generated by the UE.

According to the present invention, a UE may provides traffic information that notifies a pattern of traffic generated in the UE to a network, and the network may allocate SPS resources for the UE based on the traffic information. Accordingly, it may be prevented that the SPS resources are abused unnecessarily, and efficient SPS resource allocation is available even for the signal that a specific period is generated like the V2X signal but of which specific period is changed according to speed/direction and the like of a vehicle.

DESCRIPTION OF EXEMPLARY EMBODIMENTS

Figure 1:
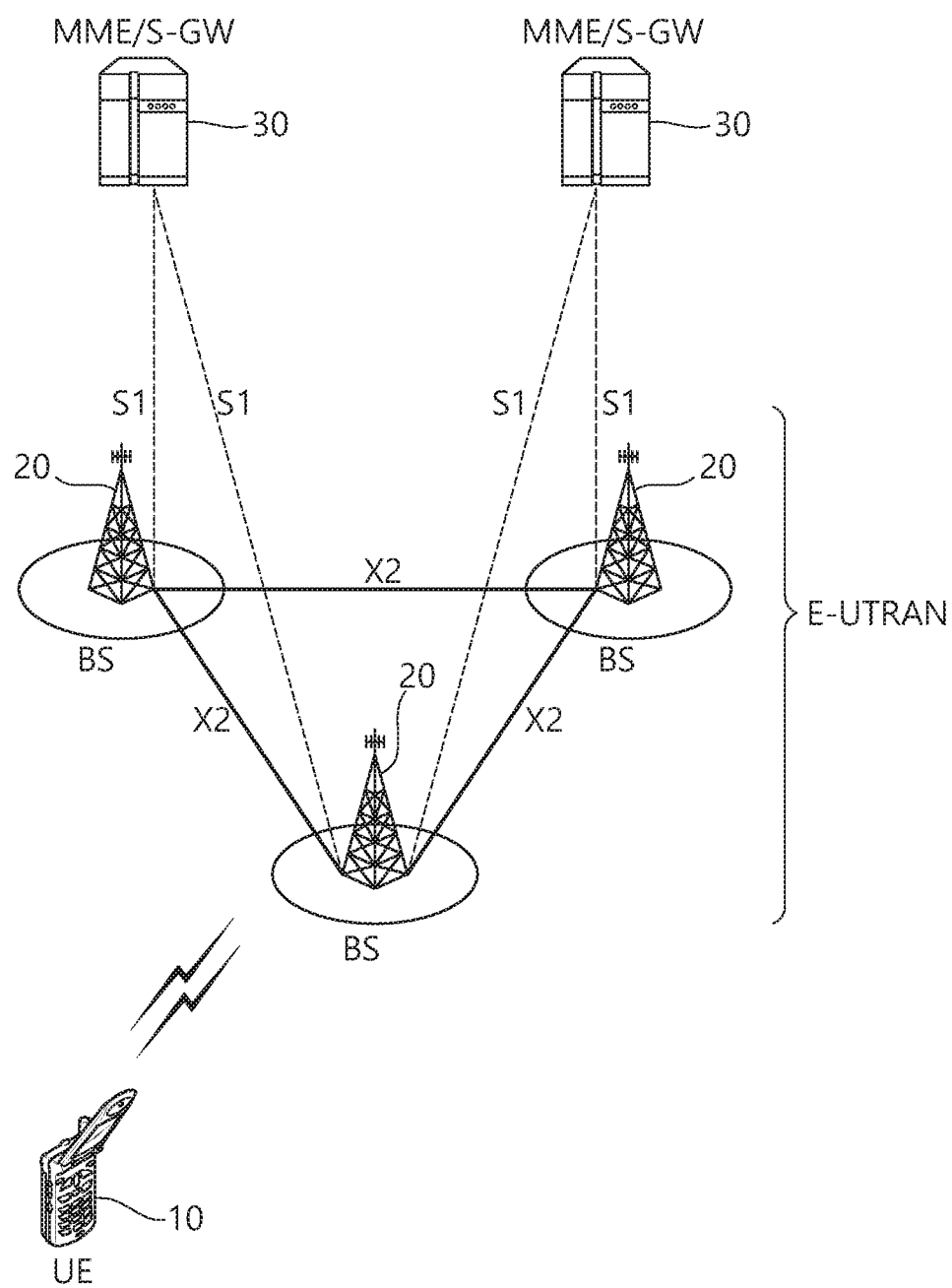
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
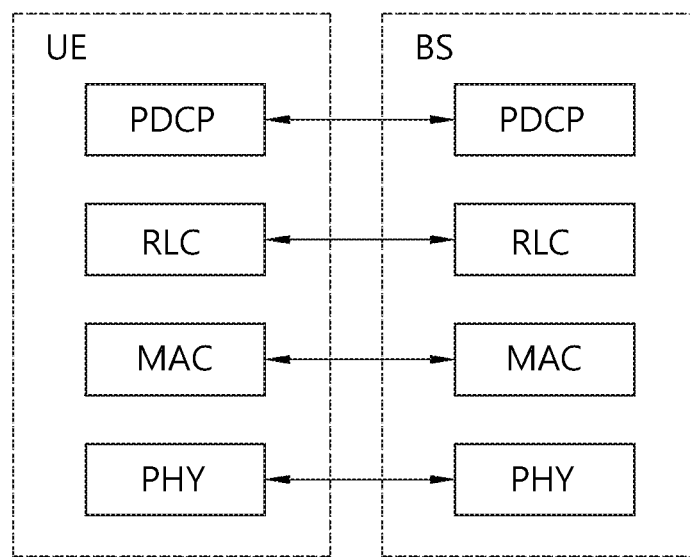
FIG. 2 is a diagram showing a wireless protocol architecture for a user plane.
Figure 3:
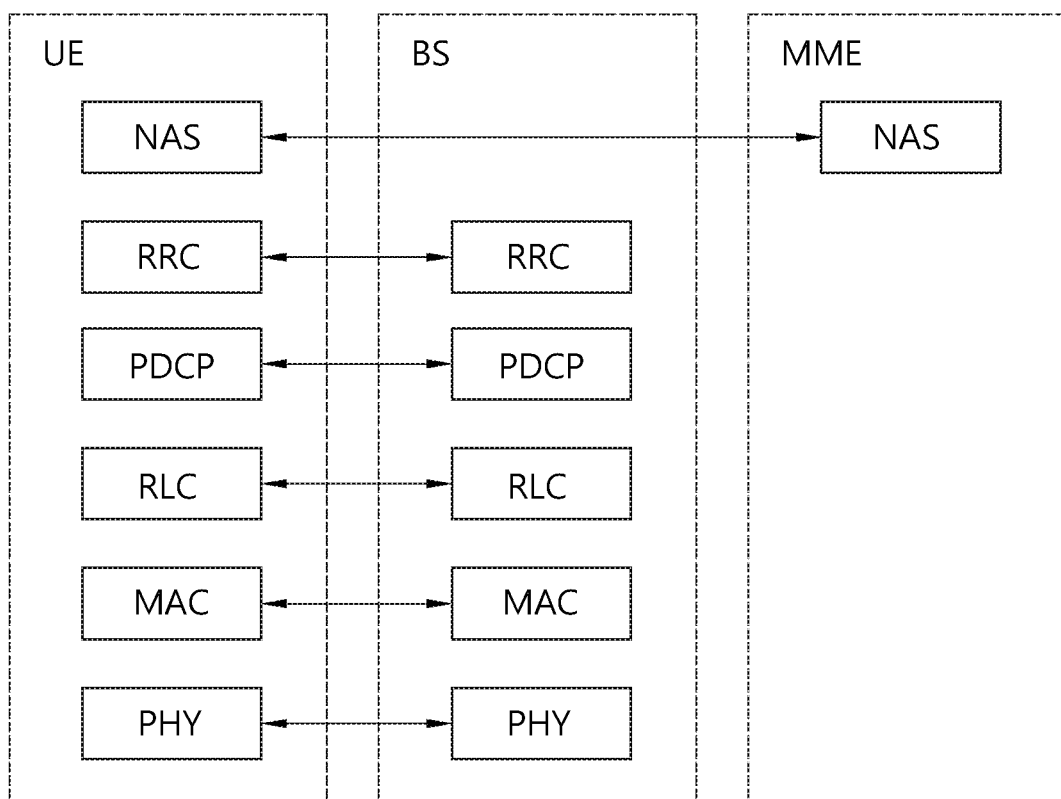
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include the limited number of parameters which are the most essential and are most frequently transmitted in order to obtain other information from a cell. UE first discovers an MIB after downlink synchronization. The MIB may include information, such as a downlink channel bandwidth, a PHICH configuration, an SFN supporting synchronization and operating as a timing reference, and an eNB transmission antenna configuration. The MIB may be broadcasted on a BCH.

SystemInformationBlockType1 (SIB1) of included SIBs is included in a "SystemInformationBlockType1" message and transmitted. Other SIBs other than the SIB1 are included in a system information message and transmitted. The mapping of the SIBs to the system information message may be flexibly configured by a scheduling information list parameter included in the SIB1. In this case, each SIB is included in a single system information message. Only SIBs having the same scheduling required value (e.g. period) may be mapped to the same system information message. Furthermore, SystemInformationBlockType2 (SIB2) is always mapped to a system information message corresponding to the first entry within the system information message list of a scheduling information list. A plurality of system information messages may be transmitted within the same period. The SIB1 and all of the system information messages are transmitted on a DL-SCH.

In addition to broadcast transmission, in the E-UTRAN, the SIB1 may be channel-dedicated signaling including a parameter set to have the same value as an existing set value. In this case, the SIB1 may be included in an RRC connection re-establishment message and transmitted.

The SIB1 includes information related to UE cell access and defines the scheduling of other SIBs. The SIB1 may include information related to the PLMN identifiers, Tracking Area Code (TAC), and cell ID of a network, a cell barring state indicative of whether a cell is a cell on which UE can camp, a required minimum reception level within a cell which is used as a cell reselection reference, and the transmission time and period of other SIBs.

The SIB2 may include radio resource configuration information common to all types of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and for detecting a change of system information to only a PCell. In an SCell, when the corresponding SCell is added, the E-UTRAN may provide all types of system information related to an RRC connection state operation through dedicated signaling. When system information related to a configured SCell is changed, the E-UTRAN may release a considered SCell and add the considered SCell later. This may be performed along with a single RRC connection re-establishment message. The E-UTRAN may set a value broadcast within a considered SCell and other parameter value through dedicated signaling.

UE needs to guarantee the validity of a specific type of system information. Such system information is called required system information. The required system information may be defined as follows.

If UE is in the RRC_IDLE state: the UE needs to have the valid version of the MIB and the SIB1 in addition to the SIB2 to SIB8. This may comply with the support of a considered RAT.

If UE is in the RRC connection state: the UE needs to have the valid version of the MIB, SIB1, and SIB2.

In general, the validity of system information may be guaranteed up to a maximum of 3 hours after being obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
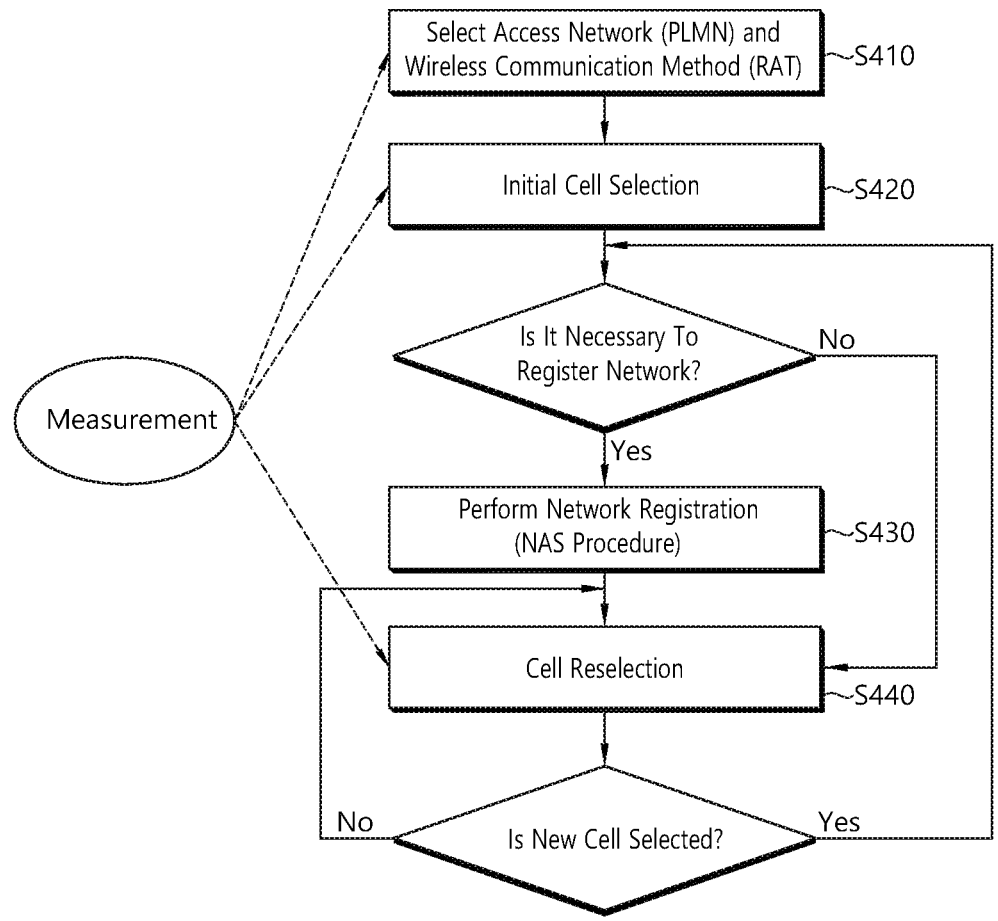
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
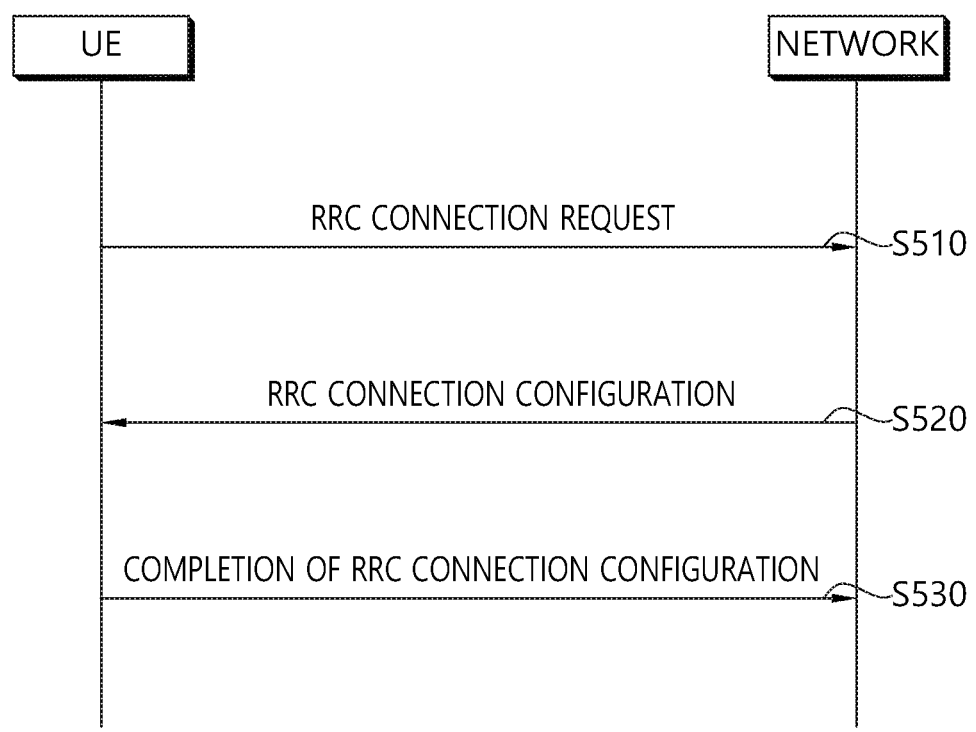
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
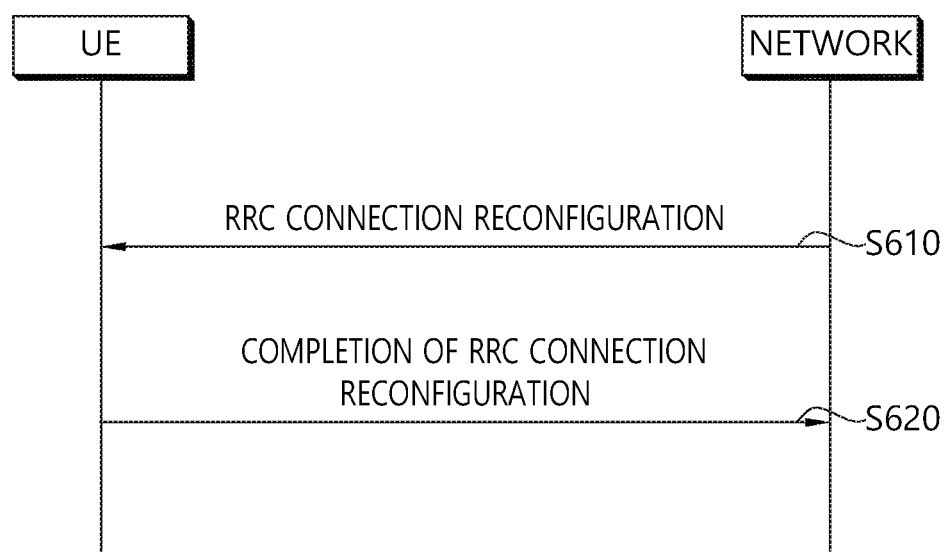
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal in a prior art.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

The cell selection criterion may be defined as below equation 1.

$$Srxlev>0 \text{ AND } Squal>0$$

where:

$$Srxlev=Q_{rxlevmeas}=(Q_{rxlevmin}+Q_{rxlevminoffset})-Pcompensation$$

$$Squal=Q_{qualmeas}-(Q_{qualmin}+Q_{qualminoffset}) \quad \text{[Equation 1]}$$

Here, the variables in the equation 1 may be defined as below table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows. First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$Rs = Qmeas,s + Qhyst, Rn = Qmeas,s - Qoffset \quad [\text{Equation 2}]$$

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
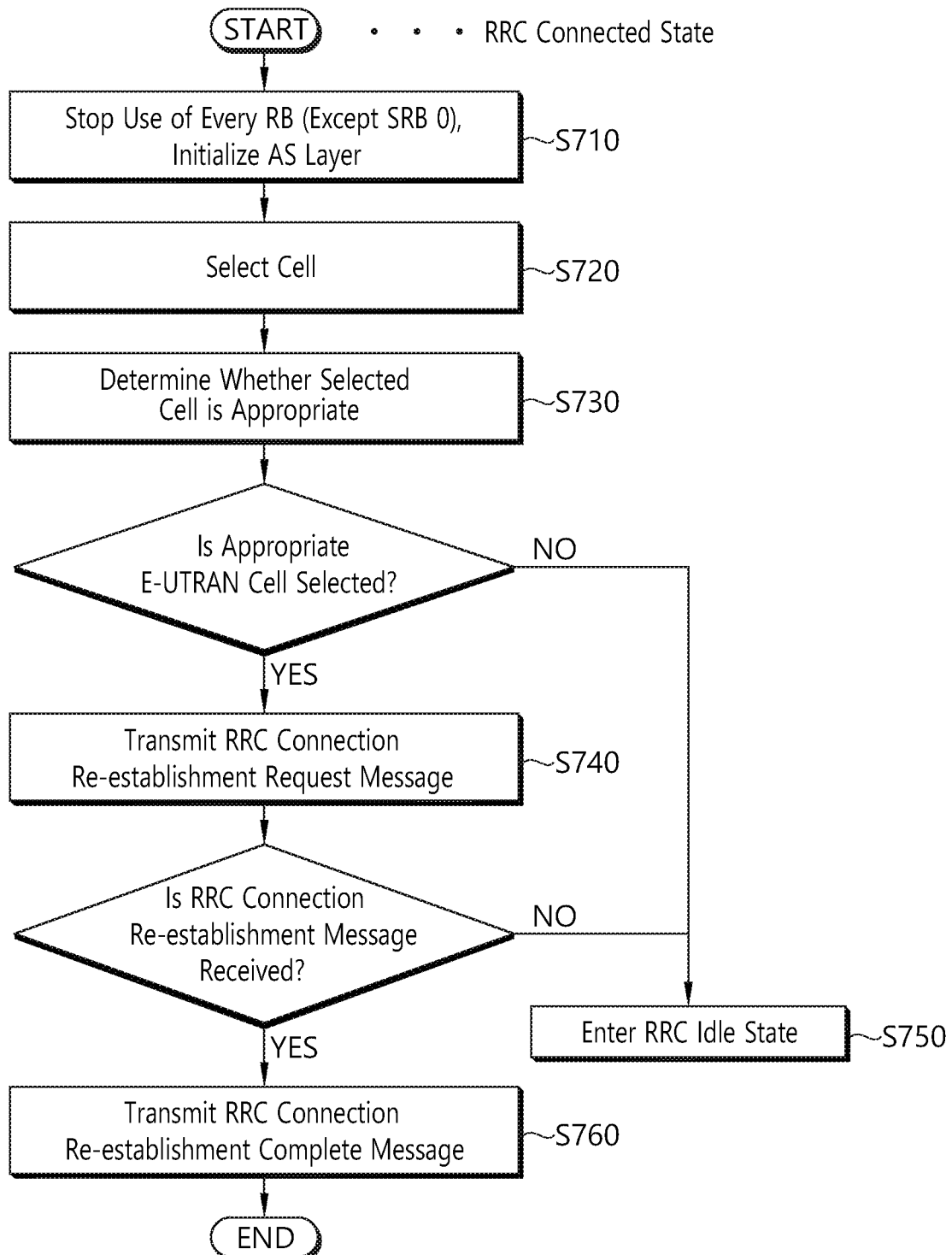
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
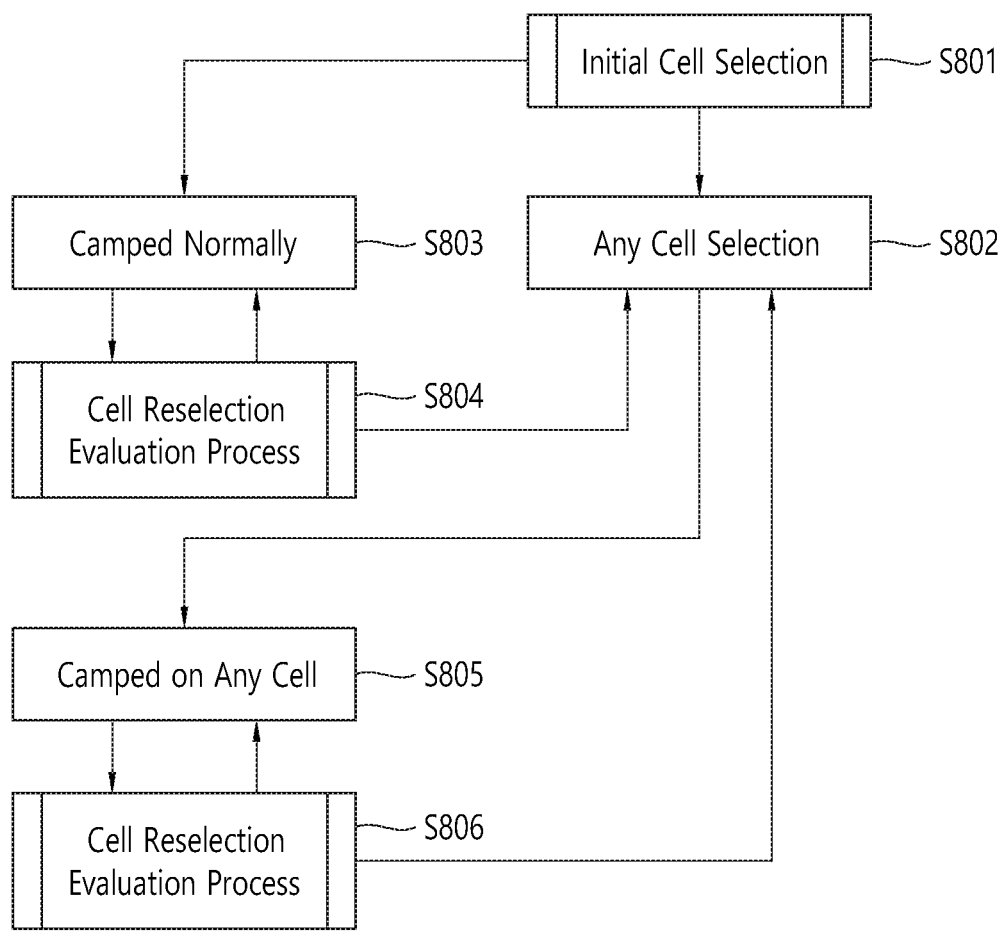
FIG. 8 illustrates substrates which may be owned by UE in the RRC_IDLE state and a substrate transition process.

FIG. 8 illustrates substrates which may be owned by UE in the RRC_IDLE state and a substrate transition process.

Referring to FIG. 8, UE performs an initial cell selection process (S801). The initial cell selection process may be performed when there is no cell information stored with respect to a PLMN or if a suitable cell is not discovered.

If a suitable cell is unable to be discovered in the initial cell selection process, the UE transits to any cell selection state (S802). The any cell selection state is the state in which the UE has not camped on a suitable cell and an acceptable cell and is the state in which the UE attempts to discover an acceptable cell of a specific PLMN on which the UE may camp. If the UE has not discovered any cell on which it may camp, the UE continues to stay in the any cell selection state until it discovers an acceptable cell.

If a suitable cell is discovered in the initial cell selection process, the UE transits to a normal camp state (S803). The normal camp state refers to the state in which the UE has camped on the suitable cell. In this state, the UE may select and monitor a paging channel based on information provided through system information and may perform an evaluation process for cell reselection.

If a cell reselection evaluation process (S804) is caused in the normal camp state (S803), the UE performs a cell reselection evaluation process (S804). If a suitable cell is discovered in the cell reselection evaluation process (S804), the UE transits to the normal camp state (S803) again.

If an acceptable cell is discovered in the any cell selection state (S802), the UE transmits to any cell camp state (S805). The any cell camp state is the state in which the UE has camped on the acceptable cell.

In the any cell camp state (S805), the UE may select and monitor a paging channel based on information provided through system information and may perform the evaluation process (S806) for cell reselection. If an acceptable cell is not discovered in the evaluation process (S806) for cell reselection, the UE transits to the any cell selection state (S802).

Now, a device-to-device (D2D) operation is described. In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 9:
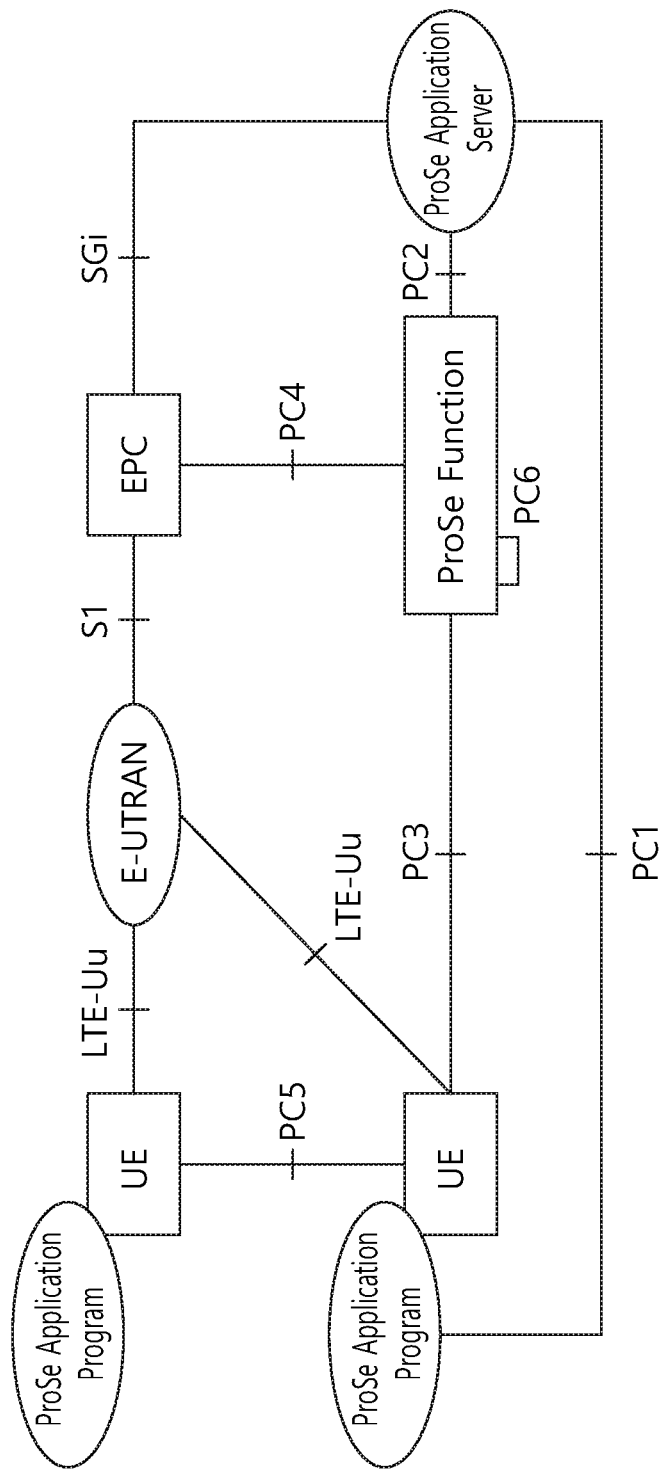
FIG. 9 shows a basic structure for ProSe.

FIG. 9 shows a basic structure for ProSe.

Referring to FIG. 9, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

<ProSe Direct Communication>

ProSe direct communication is communication mode in which two types of public safety UE can perform direct communication through a PC 5 interface. Such communication mode may be supported when UE is supplied with services within coverage of an E-UTRAN or when UE deviates from coverage of an E-UTRAN.

Figure 10:
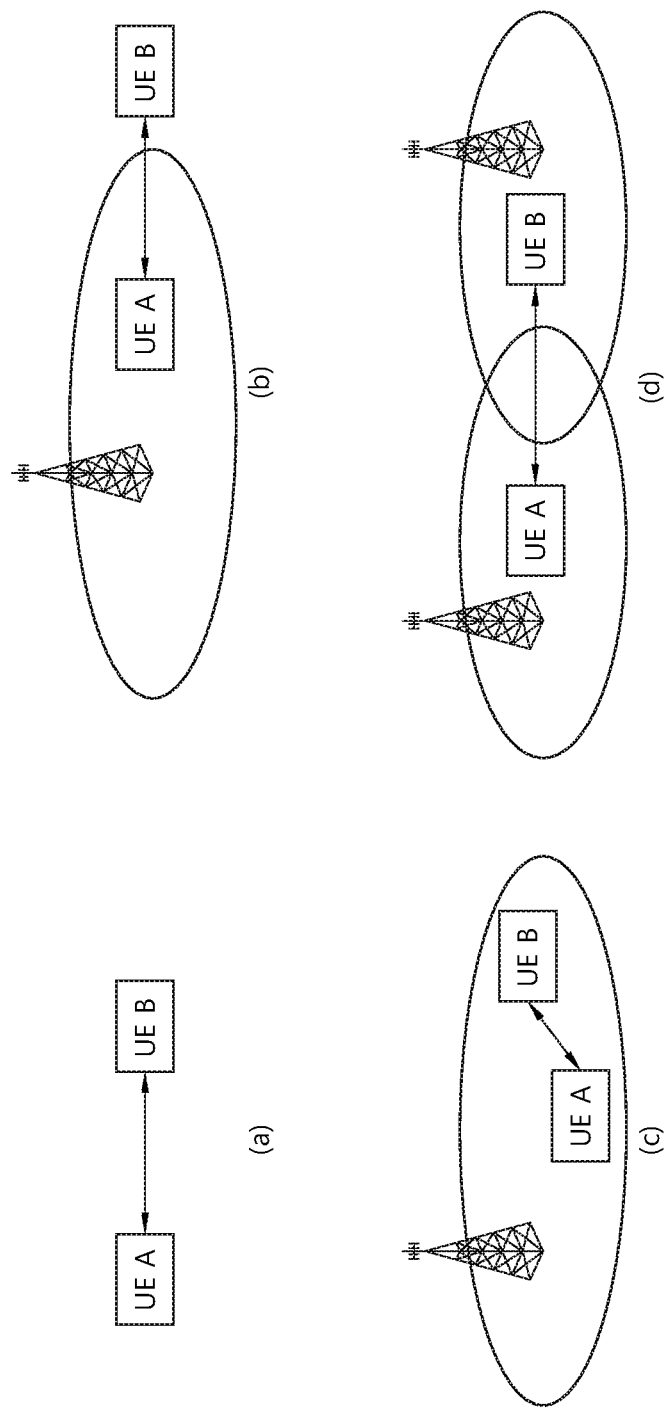
FIG. 10 shows the deployment examples of types of UE performing ProSe direct communication and cell coverage.

FIG. 10 shows the deployment examples of types of UE performing ProSe direct communication and cell coverage.

Referring to FIG. 10(a), types of UE A and B may be placed outside cell coverage. Referring to FIG. 10(b), UE A may be placed within cell coverage, and UE B may be placed outside cell coverage. Referring to FIG. 10(c), types of UE A and B may be placed within single cell coverage. Referring to FIG. 10(d), UE A may be placed within coverage of a first cell, and UE B may be placed within coverage of a second cell.

ProSe direct communication may be performed between types of UE placed at various positions as in FIG. 10.

Meanwhile, the following IDs may be used in ProSe direct communication.

A source layer-2 ID: this ID identifies the sender of a packet in the PC 5 interface.

A destination layer-2 ID: this ID identifies the target of a packet in the PC 5 interface.

An SA L1 ID: this ID is the ID of scheduling assignment (SA) in the PC 5 interface.

Figure 11:
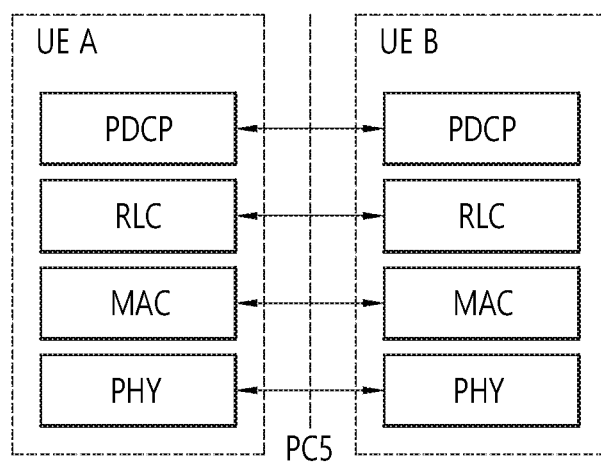
FIG. 11 shows a user plane protocol stack for ProSe direct communication.

FIG. 11 shows a user plane protocol stack for ProSe direct communication.

Referring to FIG. 11, the PC 5 interface includes a PDCH, RLC, MAC, and PHY layers.

In ProSe direct communication, HARQ feedback may not be present. An MAC header may include a source layer-2 ID and a destination layer-2 ID.

<Radio Resource Assignment for ProSe Direct Communication>

ProSe-enabled UE may use the following two types of mode for resource assignment for ProSe direct communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<ProSe Direct Discovery>

ProSe direct discovery refers to a procedure that is used for ProSe-enabled UE to discover another ProSe-enabled UE in proximity and is also called D2D direct discovery. In this case, E-UTRA radio signals through the PC 5 interface may be used. Information used in ProSe direct discovery is hereinafter called discovery information.

Figure 12:
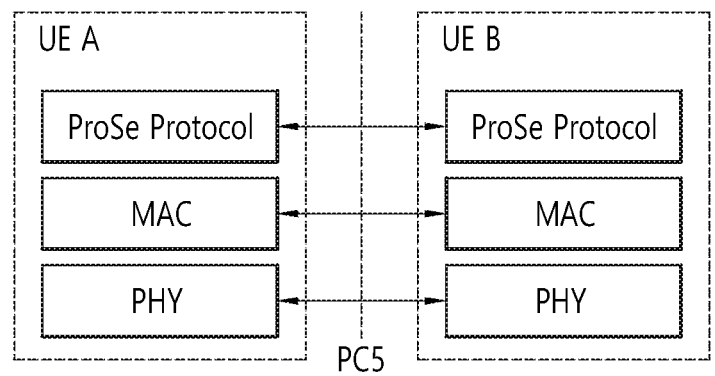
FIG. 12 shows the PC 5 interface for D2D direct discovery.

FIG. 12 shows the PC 5 interface for D2D direct discovery.

Referring to FIG. 12, the PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement.

The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

As a method in which resources for announcement of discovered information are allocated not specifically to a terminal, a base station provides a resource pool configuration for announcement of the discovered information to terminals. The configuration is included in a system information block (SIB) to be signaled by a broadcast scheme. Alternatively, the configuration may be provided while being included in a terminal specific RRC message. Alternatively, the configuration may be broadcast signaling of another layer except for an RRC message or terminal specific signaling.

The terminal autonomously selects the resource from an indicated resource pool and announces the discovery information by using the selected resource. The terminal may announce the discovery information through an arbitrarily selected resource during each discovery period.

2. Type 2

The type 2 is a method for assigning a resource for announcing discovery information in a UE-specific manner.

UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Now, the present invention is described. First, the HARQ is described.

<Hybrid Automatic Repeat Request (HARQ)>

When data is transmitted and received between an eNB and a UE, in the case of unavailable to receive a subframe or a subframe is damaged, there is Automatic Repeat request (ARQ) scheme, and a more developed form, hybrid ARQ (HARQ) scheme as an error controlling method. According to the ARQ scheme, after a single subframe transmission, incoming of an acknowledge message (ACK) is waited, and a receiver sends an acknowledge message (ACK) only in the case that the receiver receives the acknowledge message (ACK) successfully. In the case that an error occurs in the subframe, the receiver sends a negative-ACK (NACK) message, and deletes the received subframe in which the error occurs from a receiver buffer. When a transmitter receives the ACK signal, the transmitter transmits the subframe thereafter, but retransmits the subframe when the transmitter receives the NACK message.

Different from the ACK scheme, according to the HARQ scheme, a receiver transmits a NACK message to a transmitter in the case that the receiver is unable to decode a received subframe. However, the receiver stores the subframe received already in a buffer for predetermined time duration, and increases a reception succeed rate by combining it with the subframe received already when the subframe is retransmitted.

Recently, the HARQ scheme, which is more efficient than the ARQ scheme has been widely used. There are many types in the HARQ scheme. Largely, the HARQ scheme may be divided into synchronous HARQ and asynchronous HARQ according to transmission timing, and may be divided into channel-adaptive scheme and channel-non-adaptive scheme according to whether it reflects a channel state for an amount of resource which is used in retransmission. In order to perform an uplink transmission through a UL-SCH, except a non-adaptive HARQ retransmission, a MAC entity needs to have a valid uplink grant. A UE may dynamically receive the uplink grant through a PDCCH, and may receive the uplink grant through a random access response. Further the UE may be configured with the uplink grant semi-persistently. In addition, in order to perform a requested transmission, a MAC layer needs to receive HARQ information from a lower layer. In the case that uplink spatial multiplexing is setup in a physical layer, in a single TTI, the MAC layer may receive up to two grants for each HARQ process.

Next, the semi-persistent scheduling is described, to which the present invention may be applied.

<Semi-Persistent Scheduling (SPS)>

In a wireless communication system, a UE receives scheduling information such as a DL grant and a UL grant through a PDCCH, and based on the scheduling information, the UE performs an operation of receiving a PDSCH or transmitting a PUSCH. Generally, a DL grant and a PDSCH are received in the same subframe. In the subframe after a predetermined duration is lapsed based on a subframe in which a UL grant is received, a scheduled PUSCH is transmitted by the UL grant. For example, for FDD case, a PUSCH is transmitted after four subframes from the subframe in which the UL grant is received. In addition to such a dynamic scheduling, LTE/LTE-A also provides semi-persistent scheduling (SPS).

The SPS may be applied to downlink or uplink. The SPS may inform a certain subframe in which the semi-persistent transmission (PUSCH)/reception (PDSCH) is performed to a UE through a higher layer signal such as radio resource control (RRC), and it is assumed that the signal informing it is SPS configuration. The SPS configuration may be provided through a higher layer signal such as RRC, and various parameters may be included in the SPS configuration. The parameters may be a period and an offset value of a subframe, for example.

The Table below is an example of the SPS configuration.

TABLE 2

```
-- ASN1START
SPS-Config ::=     SEQUENCE {
        semiPersistSchedC-RNTI      C-RNTI         OPTIONAL,         -- Need OR
        sps-ConfigDL                SPS-ConfigDL   OPTIONAL,         -- Need ON
        sps-ConfigUL                SPS-ConfigUL   OPTIONAL          -- Need ON
}
SPS-ConfigDL ::= CHOICE{
        release                                                     NULL,
        setup                                                       SEQUENCE {
                semiPersistSchedIntervalDL                          ENUMERATED {
                                                                        sf10, sf20, sf32, sf40, sf64, sf80,
                                                                        sf128, sf160, sf320, sf640, spare6,
                                                                        spare5, spare4, spare3, spare2,
                                                                        spare1},
                numberOfConfSPS-Processes                           INTEGER (1..8),
                n1PUCCH-AN-PersistentList                           N1PUCCH-AN-PersistentList,
        ...,
```

TABLE 2-continued

```
        [[      twoAntennaPortActivated-r10                     CHOICE {
                release                                         NULL,
                setup                           SEQUENCE {
                        n1PUCCH-AN-PersistentListP1-r10         N1PUCCH-AN-PersistentList
                }
                }
                                                OPTIONAL        -- Need ON
        ]]
        }
}
SPS-ConfigUL ::= CHOICE {
        release                                 NULL,
        setup                                   SEQUENCE {
                semiPersistSchedIntervalUL              ENUMERATED {
                                                        sf10, sf20, sf32, sf40, sf64, sf80,
                                                        sf128, sf160, sf320, sf640, spare6,
                                                        spare5, spare4, spare3, spare2,
                                                        spare1},
                implicitReleaseAfter                    ENUMERATED {e2, e3, e4, e8},
                p0-Persistent                                   SEQUENCE {
                        p0-NominalPUSCH-Persistent              INTEGER (-126..24),
                        p0-UE-PUSCH-Persistent                  INTEGER (-8..7)
                }                               OPTIONAL,       -- Need OP
                twoIntervalsConfig ENUMERATED {true}    OPTIONAL,       -- Cond TDD
                ...,
                [[      p0-PersistentSubframeSet2-r12           CHOICE {
                        release                                 NULL,
                        setup                           SEQUENCE {
                                p0-NominalPUSCH-PersistentSubframeSet2-r12      INTEGER (-126..24),
                                p0-UE-PUSCH-PersistentSubframeSet2-r12          INTEGER (-8..7)
                        }
                        }
                ]]                              OPTIONAL        -- Need ON
        }
}
N1PUCCH-AN-PersistentList ::=           SEQUENCE (SIZE (1..4)) OF INTEGER (0..2047)
-- ASN1STOP
```

As represented in the Table above, the SPS configuration includes various parameters. For example, 'semiPersist-SchedIntervalDL' represents an interval of semi-persistent scheduling in downlink in a unit of subframe. 'semiPersist-SchedIntervalUL' represents an interval of semi-persistent scheduling in uplink in a unit of subframe. 'numberOfConf-SPS-Processes' represents the number of HARQ processes setup for semi-persistent scheduling.

Figure 13:
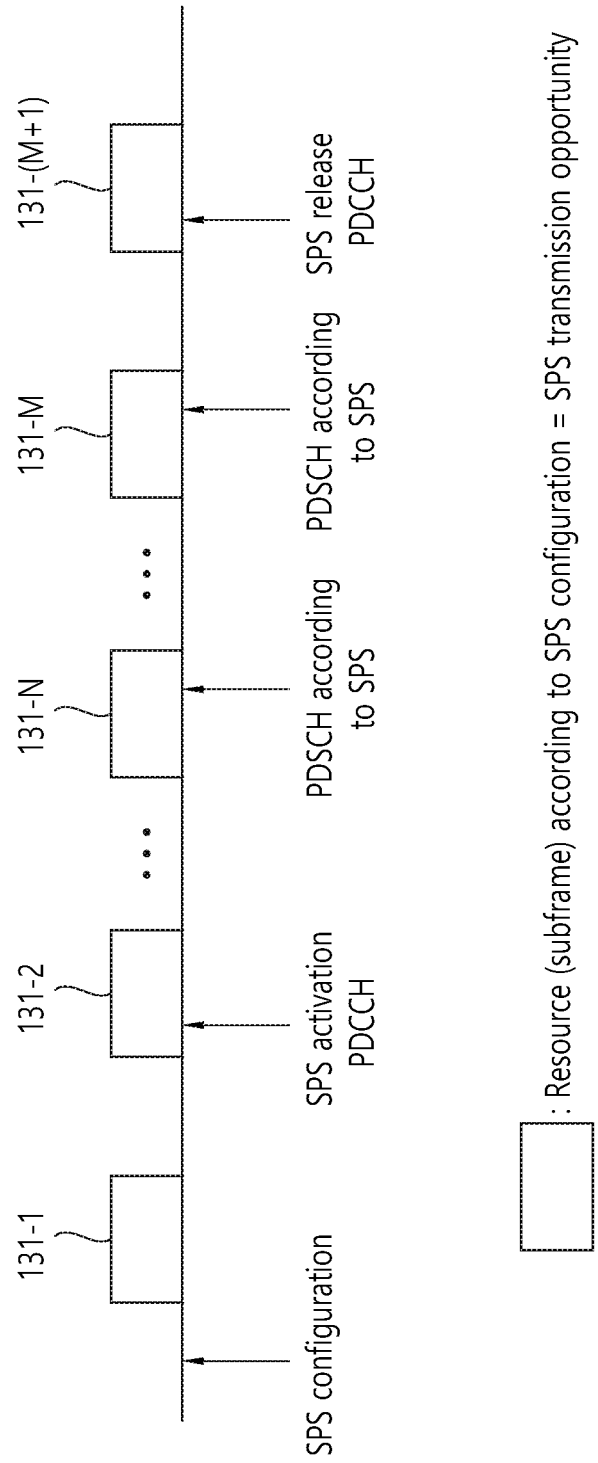
FIG. 13 illustrates a UE operation according to the SPS.

FIG. 13 illustrates a UE operation according to the SPS.

Referring to FIG. 13, a UE receives the SPS configuration through RRC signaling. The resources allocated through the SPS configuration are exemplified as subframes 131-1, 131-2, . . . , 131-N, . . . , 131-M, and 131-(M+1). When receiving the SPS configuration, the UE identifies that SPS transmission/reception may occur. When the UE receives a signal that activates or releases the SPS transmission through a PDCCH, the UE performs or releases the SPS transmission/reception. That is, even in the case that the UE receives the SPS configuration through RRC signaling, the UE performs the SPS transmission/reception immediately. However, in the case that the UE receives a signal that activates or releases the SPS transmission through a PDCCH, the UE performs the SPS transmission/reception in a subframe that corresponds to a subframe period and an offset value allocated through RRC signaling by applying modulation and coding rate according to a frequency resource (resource block) according to a resource block allocation designated by the PDCCH and MCS information. In the case that the UE receives SPS release signal through the PDCCH, the UE stops the SPS transmission/reception. The SPS transmission/reception stopped as such is restarted when the UE receives a PDCCH (SPS reactivation PDCCH) that includes SPS activation signal again by using the frequency resource, MCS, and the like designated in the corresponding PDCCH.

FIG. 13 shows an example that a UE receives SPS activation PDCCH (PDCCH including SPS activation signal) in subframe 131-2, and receives SPS release PDCCH (PDCCH including SPS release signal) in subframe 131-(M+1). The UE may receive a PDSCH according to the SPS in subframes 131-N, 131-M, and so on.

Meanwhile, in the existing SPS (particularly, uplink SPS), an eNB is unable to know an actual traffic generation time (timing) in the UE. Even in the case that the actual traffic generation time in the UE is well defined (e.g., even in the case that it is defined to generate a traffic periodically), the eNB does not know it, and accordingly, the eNB may not configure an optimal SPS configuration.

Figure 14:
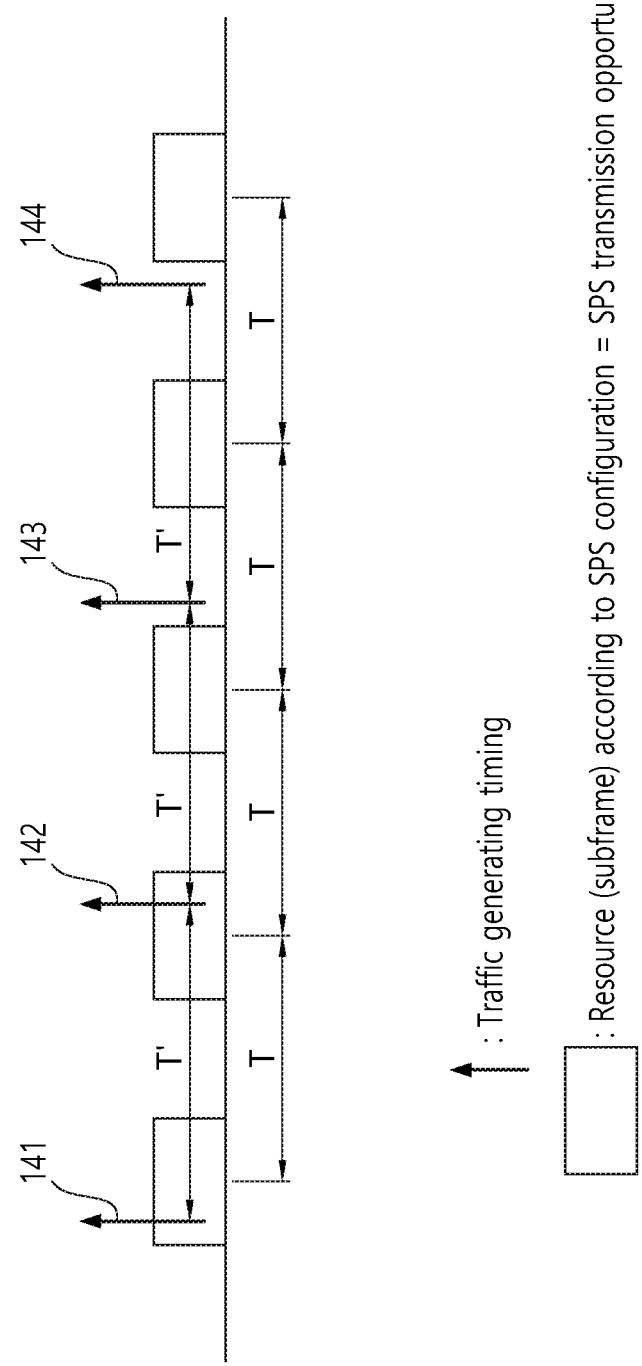
FIG. 14 illustrates a problem that may occur in the case that SPS period T of SPS resources and a generation period T' of a traffic actually generated in a UE are different.

FIG. 14 illustrates a problem that may occur in the case that SPS period T of SPS resources and a generation period T' of a traffic actually generated in a UE are different.

Referring to FIG. 14, the resources allocated according to the SPS configuration has period T, and a traffic occurs with period T' in the UE. In the case that periods T and T' are different, a part of traffic generation timing (e.g., 143 and 144) may not correspond to the resource (transmission opportunity) allocated according to the SPS configuration.

For example, a period of a signal generated periodically in a vehicle may be slightly changed depending on speed and direction of the vehicle. In the case that a vehicle is allocated with SPS resources periodically from a network to transmit signals periodically generated in the vehicle but speed and direction of the vehicle are changed and accordingly, a period of the generated signals is also changed, it may be difficult to transmit the generated signal in the SPS resources.

Furthermore, in relation to the fact that it is unable to configure an optimal SPS configuration, the following problems may occur.

1) In the resources (these are referred to as SPS resources) periodically configured for the SPS, it is assumed that the period is referred to as SPS period. In the case that the SPS period is excessively short, most of the configured resources are not used by the UE, and accordingly, resource waste may occur.

2) Even in the case that the SPS period of the SPS resources configured for a UE and the generation period of the traffic actually generated in the UE are similar, in the case that a time difference between the configured SPS opportunity and the traffic generating timing are great, it may cause bad influence on satisfying latency requirement.

In order to solve the problem, the present invention proposes a method for a UE to inform the traffic information that informs a timing pattern of data traffic to an eNB.

Figure 15:
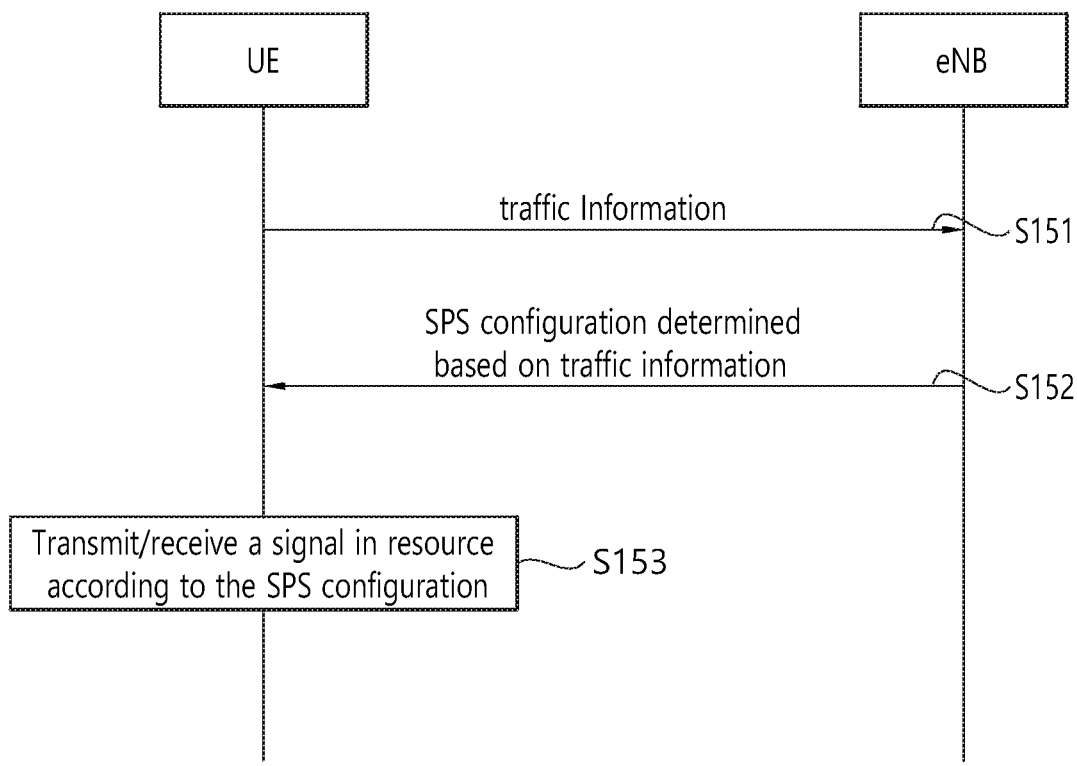
FIG. 15 illustrates a UE operation according to an embodiment of the present invention.

FIG. 15 illustrates a UE operation according to an embodiment of the present invention.

Referring to FIG. 15, a UE transmits traffic information to an eNB (step, S151).

The traffic information may be information that informs or characterizes a transmission timing of the data traffic transmitted by the UE.

For example, the traffic information may include 1) a period of traffic generation in the UE and 2) information that may inform traffic generation timing in the UE. The information that may inform traffic generation timing in the UE is as follows. For example, when there is a reference time that the UE and the eNB know commonly, the traffic generation timing in the UE may be informed by an offset value with respect to the reference time, and in this case, the offset value may correspond to the information that may inform traffic generation timing in the UE. The offset value may represent a time difference between the reference time and the time when traffic is actually generated in the UE.

The reference time may be represented, for example, by subframe #K of system frame number (SFN) #L. Both of the L and the K may be zero. Meanwhile, when the UE reports the traffic generation timing (e.g., the offset), the UE may report the traffic generation timing with margin by considering a situation that the traffic generation timing may be delayed or changed. Then, even in the case that the traffic generation timing is delayed within the margin range, it may not lose the SPS transmission opportunity.

The traffic information may further include the following information.

For example, the traffic information may include end-to-end latency requirements for the corresponding traffic. In the case of V2V message, a UE may indicate that end-to-end latency requirement is 100 milliseconds (ms). That is, the traffic information may include information indicating a latency requirement which is requested for the traffic generated by the UE.

In addition, the traffic information may also include information indicating a final destination type of the corresponding traffic. The final destination type may be a UE, a cloud server of an IP domain, a part of radio network (RRH), and the like.

Meanwhile, the UE may transmit the traffic information when at least one of the following conditions is satisfied.

1) A case that traffic to be transmitted is generated periodically

2) A case that a network indicates that it is allowed to report the traffic information by the UE 3) A case that end-to-end latency requirements for the corresponding traffic is smaller than a predetermined value (the predetermined value may be configured/indicated by a network).

The UE may provide the traffic information to the eNB using an RRC message. That is, the UE may include the traffic information in the RRC message transmitted to a network. The UE may include the traffic information in the RRC message generated by the UE in order to inform services such as V2X service and V2V transmission.

When the eNB receives the traffic information, the eNB may provide/configure the SPS configuration determined based on the traffic information (step, S152). For example, in the SPS configuration associated with the traffic information, the SPS period may be identically configured with the traffic generation period reported by the UE. Alternatively, in the case that the SPS period is selected among a plurality of candidate values, even in the case that the SPS period is not the same as the traffic generation period reported by the UE, the SPS period may be configured as the value of which difference from the traffic generation period is the smallest.

The UE transmits/receives a signal in the resource according to the SPS configuration (step, S153). The signal may be vehicle-to-everything (V2X) signal or D2D signal.

Meanwhile, it is general that a specific time is required until traffic is prepared to be transmitted to a radio channel of a physical layer actually after the traffic is generated in an application layer. When this time is denoted as T_process, it is preferable that the transmission timing according to the SPS that a network set to a UE is configured after as much as minimum T_process from the timing when the traffic is generated in an application of the UE. Accordingly, in the case that the traffic generation timing provided by the UE through the traffic information indicates the timing when the traffic is generated in an application layer, it may be required to report T_process also required for the UE. That is, the traffic information may be transmitted together with the traffic generation timing and T_process information in an application layer. The network may setup the transmission timing (transmission resource and transmission opportunity) according to the SPS by considering both of the timing when the traffic is generated in an application layer of the UE and the T_process.

Different from this, in the case that the traffic generation timing provided by the UE through the traffic information indicates transmission timing in a physical layer, it may not be required to report T_process. However, the UE is required to report the traffic generation timing considering the T_process to the network.

<Dynamic SPS Adjustment Request>

As described above, the traffic information may be information that characterizes a traffic generation pattern of a UE in a time domain. In some cases, the traffic generation timing that a UE reports to an eNB may be slightly different from the timing when traffic is actually generated in the UE. That is, slight deviation may occur, and such deviation may be generated in each of the SPS transmissions. In this case, it may be required for the UE to transmit the SPS adjustment request that requests to adjust the timing of the SPS to the network. The UE may transmit the SPS adjustment request through an uplink control channel.

Figure 16:
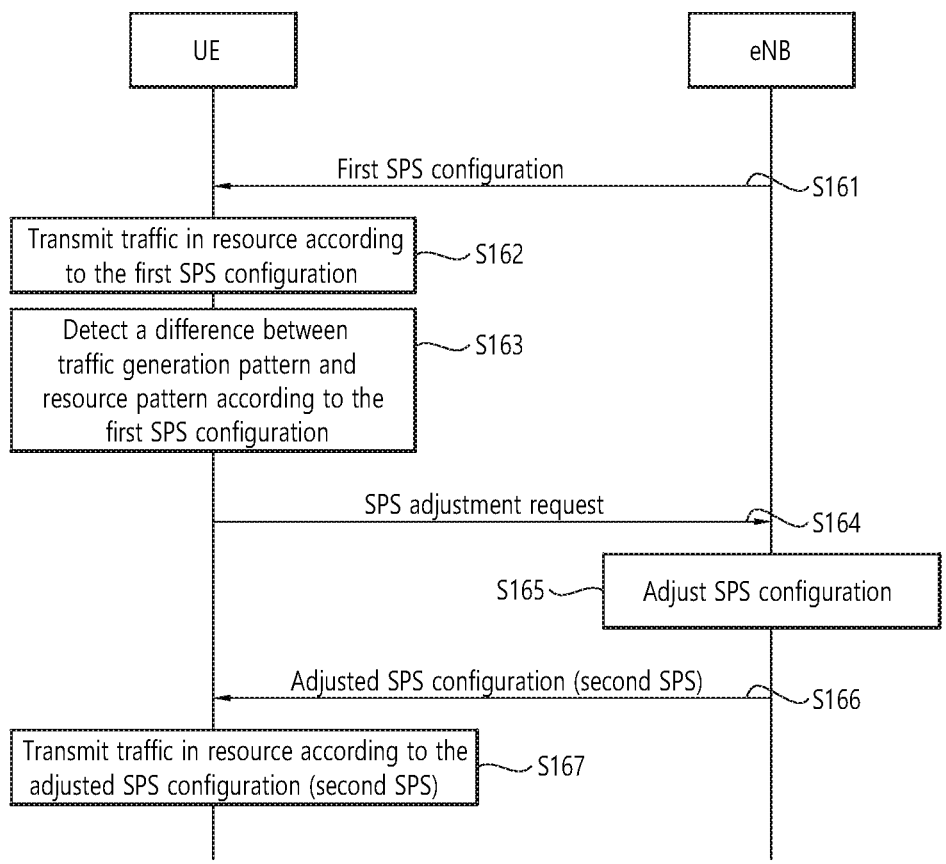
FIG. 16 illustrates an example that a UE transmits SPS adjustment request.

FIG. 16 illustrates an example that a UE transmits SPS adjustment request.

Referring to FIG. 16, a UE receives a first SPS configuration from an eNB (step, S161).

The UE transmits traffic in the resource according to the first SPS configuration (step, S162).

The UE detects a difference between a traffic generation pattern and a resource pattern according to the first SPS configuration (step, S163).

In the case that the difference is a predetermined value or greater, the UE transmits the SPS adjustment request that requests an adjustment of the first SPS configuration to a network (step, S164).

After the eNB adjusts the SPS configuration (step, S165), the eNB provides an adjusted SPS, that is, a second SPS configuration to the UE (step, S166). The UE transmits traffic in the resource according to the adjusted SPS configuration (second SPS configuration) (step, S167).

The SPS adjustment request may include at least one of the followings:

1) The SPS adjustment request may include information requesting to delay transmission timing of the UE as much as a predetermined value. Here, the predetermined value may be set by a network. Otherwise, the predetermined value may be indicated by the UE in a timing adjustment request.

2) The SPS adjustment request may include information requesting to advance transmission timing of the UE as much as a predetermined value. Here, the predetermined value may be set by a network. Otherwise, the predetermined value may be indicated by the UE in a timing adjustment request.

Meanwhile, a case may occur that access stratum (AS) layer of the UE fails to receive the traffic scheduled to be transmitted in a specific SPS transmission opportunity in the specific SPS transmission opportunity (i.e., timing) from a higher layer. In this case, the UE may inform that the UE is not going to use the specific SPS transmission opportunity to the eNB.

For example, it is assumed that the UE has a grant set for subframe N. That is, the UE has the SPS transmission opportunity in subframe N. The grant may indicate a resource of which use is allowed in subframe N. In the case that the UE knows that there is not traffic to be transmitted in subframe N before a time denoted by T_deadline, the UE may inform this to the eNB. The UE may inform this to the eNB using an uplink control channel. Through such an operation, the UE informs that the UE is not going to use the SPS transmission opportunity in subframe N to the eNB, and therefore, it may be prevented to waste the SPS transmission opportunity. The eNB may schedule subframe N to other UE.

The time denoted by T_deadline may set to the UE by the network.

In the description above, an example is described that the UE provides the traffic information to the eNB. However, the UE may not report the traffic information, but MME or other network node may inform the traffic information of the UE to the eNB. In the case that MME or other network node may know the traffic generation for the UE from the UE context setup for the UE or adjustment process, the MME or other network may inform the traffic information of the UE to the eNB.

<SPS Configuration Associated with a Logical Channel>

An eNB may setup one or a plurality of SPS configurations to a UE.

Each SPS configuration may provide a grant which is periodically setup to a UE. Similar to the conventional SPS configuration, the SPS configuration according to the present invention may also provide a grant, which is periodically setup to a UE, that is, resource allocation information. At this time, a parameter included in an SPS configuration may be different from a corresponding parameter included in another SPS configuration. For example, an eNB may provide a first SPS configuration and a second SPS configuration to a UE. Each SPS configuration may include an SPS period, an offset value, and the like as parameters. In this case, the value of the SPS period parameter included in the first SPS configuration and the value of the SPS period parameter included in the second SPS configuration may be different with each other.

Each SPS configuration may be associated with a specific logical channel, and the data transmitted through the specific logical channel may be transmitted using the SPS configuration associated with the specific logical channel. For this, when configuring the SPS configuration, an eNB may inform an identity (ID) of the logical channel which is associated with the SPS configuration.

Considering that each logical channel is associated with a specific QoS, generally, the association between the logical channel and the SPS configuration may be association between a particular QoS and a particular SPS configuration. That is, it is available to associate each of traffics with different SPS configurations for transmitting traffic that has different QoS requirements.

<Flexible SPS Configuration Using a Bitmap>

The SPS transmission opportunities according to the conventional SPS configuration may be characterized as a periodic transmission opportunity in a time domain. For example, in the case that the SPS transmission may be performed in subframes having period N such as n+N subframe, n+2N subframe and n+3N subframe, it may be represented that a UE has an SPS transmission opportunity in the n+N subframe, n+2N subframe and n+3N subframe.

In the present invention, an eNB may setup more flexible SPS configuration using the following method.

The transmission opportunities may be indicated by a bitmap pattern. In each bit of the bitmap, value 1 corresponds to a grant configured for a transmission, and value 0 does not correspond to a grant configured for a transmission. For example, it is assumed 40 subframes having period N such as n+N subframe, n+2N subframe, . . . , n+40N subframe. Here, it is assumed that N=1 for the convenience of description.

In this case, a bitmap may be given as 40 bits for the 40 subframes as below.

"YxxxxxxxxxYxxxxxxxxxYxxxxxxxxxxxxxxxxxxxx".

In the bitmap, a leftmost bit may correspond to a reference timing that a UE and a network commonly know. For example, the leftmost bit may correspond to subframe #N in a subframe corresponding to system frame number (SFN) #M. Here, both of N and M may be zero. In this case, a bit located next to the leftmost bit may correspond to subframe #N+1 of SFN #M.

In the bitmap, a bit denoted by 'Y' may represent a grant configured for a transmission in a corresponding subframe, and a bit denoted by 'x' may represent that there is not grant configured for a transmission in a corresponding subframe. That is, in a subframe corresponding to a bit which is denoted by 'Y', a UE may perform an SPS transmission, and in a subframe corresponding to a bit which is denoted by 'x', a UE may not perform an SPS transmission.

In FIG. 16 described above, the adjusted SPS configuration may be provided with the bitmap format.

Figure 17:
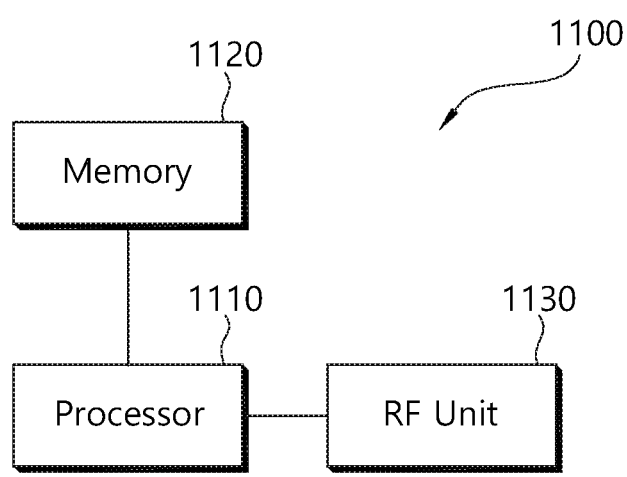
FIG. 17 is a block diagram illustrating a UE in which an embodiment of the present invention is implemented.

FIG. 17 is a block diagram illustrating a UE in which an embodiment of the present invention is implemented.

Referring to FIG. 17, a UE 1100 includes a processor 1110, a memory 1120 and a radio frequency unit 1130. For example, the processor 1110 implements the proposed function, process and/or method. For example, the processor 1110 may transmit the traffic information, receive the SPS configuration determined based on the traffic information, and transmit a signal in at least one resource among the resources according to the SPS configuration. At this time, the traffic information may be information that informs a pattern of the traffic generated by the UE. Such an operation has been described already in detail. The RF unit 1130 may transmit and receive a radio signal with being connected with the processor 1110, and may be referred to as a transceiver.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for operating a User Equipment (UE) in a wireless communication system, the method comprising:
    transmitting, to a base station, information comprising traffic information informing a pattern of traffic related to the UE to assist the base station to configure semi-persistent scheduling (SPS);
    receiving, from the base station, an SPS configuration related to the traffic information,
    detecting a difference between a resource pattern according to the SPS configuration and a pattern of the traffic generated by the UE; and
    transmitting a SPS adjustment request that requests an adjustment of the SPS configuration to a network, based on the difference being a predetermined value or greater,
    wherein the traffic information includes i) a periodicity of the traffic related to the UE and ii) a UE-preferred timing adjustment value,
    wherein the UE-preferred timing adjustment value comprises a preferred time to delay transmission timing of the UE and a preferred time to advance transmission timing of the UE,
    wherein the traffic information further includes offset information that informs timing of the traffic related to the UE,
    wherein the offset information is information informing a generation timing of the traffic related to the UE based on a reference timing that the UE and a network commonly know,
    wherein the traffic information further includes information informing a final destination of the traffic related to the UE,
    wherein the traffic information further includes information informing a latency requirement required in the traffic related to the UE,
    wherein the SPS adjustment request requests to advance or delay, in a time domain, resources of the resource pattern that are configured according to the SPS configuration,
    wherein the traffic information further includes end-to-end latency requirement of vehicle to vehicle (V2V) traffic, and
    wherein the UE transmits the traffic information based on the end-to-end latency requirement being smaller than a value which is configured by the base station.

2. The method of claim 1, wherein the SPS configuration includes one or more configurations and each of the one or more configurations is a message configuring a plurality of resources which is periodically configured.

3. The method of claim 1, wherein the reference timing is a first subframe of a frame of which system frame number is zero.

4. The method of claim 1, wherein the SPS configuration is received through a higher layer message.

5. The method of claim 1, wherein the SPS adjustment request is included in the traffic information.

6. The method of claim 1, wherein the SPS adjustment request includes information indicating a resource that the UE is not going to use among resources of the resource pattern that are configured according to the SPS configuration.

7. The method of claim 1, wherein the SPS adjustment request requests to advance or delay, in a time domain, resources of the resource pattern that are configured according to the SPS configuration.

8. The method of claim 1, wherein the SPS configuration includes a bitmap, wherein each bit of the bitmap corresponds to each subframe among a plurality of subframes configured by the SPS configuration.

9. The method of claim 8, wherein each bit of the bitmap represents whether each subframe among the plurality of subframes configured by the SPS configuration is used for a signal transmission of the UE.

10. A User Equipment (UE), comprising:
    a transceiver configured to transmit and receive a radio signal; and
    a processor configured to operate with being connected to the transceiver,
    wherein the processor is configured to perform:
    transmitting, to a base station, information comprising traffic information informing a pattern of traffic related to the UE to assist the base station to configure semi-persistent scheduling (SPS); and
    receiving, from the base station, an SPS configuration related to the traffic information,
    detecting a difference between a resource pattern according to the SPS configuration and a pattern of the traffic generated by the UE; and
    transmitting a SPS adjustment request that requests an adjustment of the SPS configuration to a network, based on the difference being a predetermined value or greater,
    wherein the traffic information includes i) a periodicity of the traffic related to the UE and ii) a UE-preferred timing adjustment value,
    wherein the UE-preferred timing adjustment value comprises a preferred time to delay transmission timing of the UE and a preferred time to advance transmission timing of the UE,
    wherein the traffic information further includes offset information that informs timing of the traffic related to the UE,
    wherein the offset information is information informing a generation timing of the traffic related to the UE based on a reference timing that the UE and a network commonly know,
    wherein the traffic information further includes information informing a final destination of the traffic related to the UE, wherein the traffic information further includes information informing a latency requirement required in the traffic related to the UE,
wherein the SPS adjustment request requests to advance or delay, in a time domain, resources of the resource pattern that are configured according to the SPS configuration,
wherein the traffic information further includes end-to-end latency requirement of vehicle to vehicle (V2V) traffic, and
wherein the UE transmits the traffic information based on the end-to-end latency requirement being smaller than a value which is configured by the base station.

* * * * *